(12) United States Patent
Lee et al.

(10) Patent No.: US 8,758,639 B2
(45) Date of Patent: *Jun. 24, 2014

(54) ELECTROLYTE COMPOSITION WITH A LOW GELLING TEMPERATURE AND METHOD FOR MANUFACTURING ELECTRONIC DEVICE USING THE SAME

(75) Inventors: Yuh-Lang Lee, Tainan (TW); Ching-Lun Chen, Taichung (TW)

(73) Assignee: National Cheng Kung University, Tainan (TW)

( * ) Notice: Subject to any disclaimer, the term of this patent is extended or adjusted under 35 U.S.C. 154(b) by 15 days.

This patent is subject to a terminal disclaimer.

(21) Appl. No.: 13/064,516

(22) Filed: Mar. 30, 2011

(65) Prior Publication Data

US 2012/0018077 A1    Jan. 26, 2012

(30) Foreign Application Priority Data

Jul. 23, 2010    (TW) ............................... 99124262 A

(51) Int. Cl.
    *H01L 31/042*    (2014.01)
(52) U.S. Cl.
    USPC ......................................... 252/62.2; 136/263

(58) Field of Classification Search
    USPC ........................................................ 252/62.2
    See application file for complete search history.

(56) References Cited

U.S. PATENT DOCUMENTS 5,858,264 A * 1/1999 Ichino et al. ................. 252/62.2
6,150,455 A * 11/2000 Takamiya et al. ............. 524/566

OTHER PUBLICATIONS

Chen et al, Preparation of highly efficient gel-state dye-sensitized solar cells using polymer gel electrolytes based on poly(acrylonitrile-co-vinyl acetate), Journal of materials Chemistry, 21, pp. 628-632, published online Dec. 21, 2010.*

* cited by examiner

*Primary Examiner* — Carol M Koslow
(74) *Attorney, Agent, or Firm* — The PL Law Group, PLLC

(57) ABSTRACT

An electrolyte composition with a low gelling temperature is disclosed, which includes: an electrolyte gelator which is an acrylonitrile-based copolymer; and a liquid electrolyte containing a nitrile-based solvent. A method for manufacturing an electronic device using the aforesaid electrolyte composition is also disclosed.

5 Claims, 2 Drawing Sheets

ELECTROLYTE COMPOSITION WITH A LOW GELLING TEMPERATURE AND METHOD FOR MANUFACTURING ELECTRONIC DEVICE USING THE SAME

BACKGROUND OF THE INVENTION

1. Field of the Invention

The present invention relates to an electrolyte composition and a method for manufacturing an electronic device using the same and, more particularly, to an electrolyte composition suitable to gel at a low temperature and a method for manufacturing an electronic device using the same.

2. Description of Related Art

Since the cost for manufacturing and the price are relative low, the industry and the researcher focus on the dye-sensitized solar cells (DSSCs) containing a liquid electrolyte in recent year. However, such solar cells have many drawbacks such as technical difficulty for sealing, and overflowing of the applied liquid electrolyte.

Currently, researchers have reported the possibility of the application of a gel electrolyte. However, the barrier in applying a gel electrolyte in DSSCs to promote ionic conductivity thereof needs to be overcome. Generally, polymers are used as a gelator. However, as the degree of crosslinking in the polymers increases, the rotation and the twist of the bonding between monomers become difficult. Therefore, the ionic conductivity of gel electrolyte is much lower than that of the liquid electrolyte.

At present, solvents commonly used in the gel electrolyte, such as 3-methoxyacetonitrile, have high boiling point and low volatility. Nevertheless, interaction between the solvents and the gelator is weak, and thus heating the electrolyte has to be performed (at 80° C. or more) to dissolve the gelator therein. Besides, high temperature is helpful for dissolving the gelator in the electrolyte to keep the mixture in good fluidity and hence high temperature is also helpful to inject the electrolyte into the cells, in which the injected electrolyte is then transformed into a gel electrolyte.

However, when the cells are preheated to a high temperature, it is possible that the dye is desorbed or degraded. In addition, the solvents with a high boiling point generally have high viscosity, and thus permeation of the produced electrolyte into pores of porous nanofilms inside the cells becomes very difficult. This results in deterioration of the contact between the electrolyte and the electrodes.

SUMMARY OF THE INVENTION

The object of the present invention is to provide an electrolyte composition with a low gelling temperature, in which suitable electrolyte gelators and suitable organic solvents are incorporated in the liquid electrolyte. For example, an acrylonitrile-based copolymer serving as an electrolyte gelator is combined with a nitrile-based solvent used as a solvent of the liquid electrolyte, and thus interaction occurs between the acrylonitrile of the copolymer and the nitrile-based solvent. When the composition is applied as an electrolyte of DSSC, the electrolyte can exhibit good fluidity and solutes in the liquid electrolyte can demonstrate desirable solubility without a heating process. Moreover, the electrolyte can stand for a while to form a gel electrolyte.

To achieve the object, the present invention provides an electrolyte composition with a low gelling temperature, which includes: an electrolyte gelator which is an acrylonitrile-based copolymer; and a liquid electrolyte comprising a nitrile-based solvent.

The electrolyte composition mentioned above can be employed as an electrolyte of DSSC. The low gelling temperature means that the electrolyte composition can gel without a heating process. In general, the low gelling temperature refers to room temperature, even to room temperature of 0° C. or less. For example, the low gelling temperature can be in a range from 0° C. to 50° C. such as 5° C., 10° C., 15° C., 20° C., 25° C., 30° C., 35° C., 40° C., and 45° C.

Referring to selection of the electrolyte gelator, the agent requires the characteristics as follows: (1) being capable of dissolving in the liquid electrolyte; (2) sufficient interaction between molecules of the agent to induce gelation; and (3) low resistance or even friendly assistance to charge transportation. Because the present invention tries to make the electrolyte composition become a gel at a low temperature without a heating process, an acrylonitrile-based copolymer serving as an electrolyte gelator is combined with a nitrile-based solvent serving as a solvent of the liquid electrolyte to elicit interaction between acrylonitrile of the copolymer and the nitrile-based solvent to reduce volatility of the nitrile-based solvent. Therefore, the electrolyte needs to contain a sufficient amount of the acrylonitrile-based copolymer in order to achieve the above-mentioned performance. In addition, the acrylonitrile-based copolymer can keep its original nitrile group in the liquid electrolyte and make salts ionized better to provide high ionic conductivity. Therefore, good photovoltaic performance can be maintained in the resultant solar cells.

In the present invention, if more nitrile-based solvent is used in the electrolyte composition, more acrylonitrile-based copolymer or the acrylonitrile-based copolymer with a higher ratio of acrylonitrile needs to be used. For example, if the amount of the electrolyte gelator is 3-9 wt % in the electrolyte composition, the acrylonitrile amount in the acrylonitrile-based copolymer can be 85 wt % or more and less than 100 wt %. The amount of the electrolyte gelator can be, for example, 3.5 wt %, 4 wt %, 4.5 wt %, 5 wt %, 5.5 wt %, 6 wt %, 6.5 wt %, 7 wt %, 7.5 wt %, 8% wt, and 8.5% wt in the electrolyte composition, and preferably is 5-9 wt %, and more preferably is 7-9 wt %. The amount of the acrylonitrile in the acrylonitrile-based copolymer can be, for example, 87 wt %, 91 wt %, 94 wt %, 97 wt %, and 99 wt %, and preferably is 87-97 wt %, and more preferably is 89-95 wt %. Besides, the number average molecular weight of the acrylonitrile-based copolymer used is approximately in a range from 250,000 to 750,000. For example, the number average molecular weight thereof can be 200,000, 300,000, 400,000, 500,000, 600,000, 700,000, and 800,000.

Accordingly, the acrylonitrile-based copolymer suitable to the present invention is substantially constructed by acrylonitrile employed as a major monomer and the other serving as a minor monomer. When the acrylonitrile serves as a major monomer, the copolymer formed by polymerization can have a lot of nitrile groups (high electronegativity) and thus the nitrile groups and lithium cations easily combine to form a complex polymer, resulting in promotion of dissolving the copolymer in the solvent. Meanwhile, the dissociation of the anions is also enhanced to increase the charge transportation thereof.

The polymer of the minor monomer used in the present invention has lower glass transition temperature (Tg) than that of poly(acrylonitrile). Therefore, Tg of the whole copolymer can be decreased to benefit gelation. For example, the minor monomer can be ethylene oxide, propylene oxide, bis(methoxy ethoxyethoxide) phosphazene, dimethylsiloxane, methyl methacrylate, vinyl acetate, vinyl chloride, vinylidene fluoride, hexafluorpropylene, or a copolymer thereof.

In one aspect of the present invention, poly(acrylonitrile-co-vinyl acetate) is used as the acrylonitrile-based copolymer of the abovementioned electrolyte composition. In the poly(acrylonitrile-co-vinyl acetate), the amount of acrylonitrile monomer is 87-97 wt % and that of vinyl acetate monomer is 3-13 wt %. However, if another monomer mentioned above is used as the minor monomer, the ratio between the major and minor monomers can be adjusted based on the common sense in the art and is not limited in the abovementioned range.

In the aforesaid electrolyte composition, the present invention selects the nitrile-based solvent having the characteristics of low viscosity (i.e., good fluidity or permeability), low vapor pressure (i.e., low volatility), suitable donor number (DN, i.e., ability of balancing between the solvent and the ionic concentration in the electrolyte), high difficulty in desorbing the dye (i.e., keeping stability of the electrode), and so on.

The nitrile-based solvent can be represented by R—CN, in which R is $C_{1-5}$ alkyl, $C_{2-4}$ alkenyl, $C_{2-4}$ alkynyl, or —$R_1$—O—$R_2$, in which $R_1$ and $R_2$ independently are $C_{1-4}$ alkyl, $C_{2-3}$ alkenyl, or $C_{2-3}$ alkynyl and the total carbon number of $R_1$ and $R_2$ is less than 6. Besides, when $R_1$ is $C_2$ alkyl, one of carbon atoms in the $C_2$ alkyl can be secondary.

The nitrile-based solvent can be, for example, acetonitrile, methoxyacetonitrile, propionitrile, butyronitrile, 2-methoxypropionitrile, petanonitrile, hexanonitrile, or a combination thereof. In addition, the nitrile-based solvent can be a solvent mixture. For example, the solvent with the nitrile group is employed as a major solvent and combined with another solvent serving as a minor solvent. In the combination, the major solvent can be used in an amount from 80 vol % or more to less than 100 vol %, and the minor solvent can be used in an amount from more than 0 vol % to 20 vol % or less. Preferably, the major solvent can be used in an amount from 90 vol % or more to less than 100 vol %, and the minor solvent can be used in an amount from more than 0 vol % to 10 vol % or less. The minor solvent can be, for example, ethylene carbonate, propylene carbonate, 1,2-dimethoxyethane, dimethylsulfoxide, dimethylformamide, dimethylsulfide, tetrahyfrofuran, diethyl carbonate, 3-methoxypropionitrile, or a combination thereof. If the mixture of the solvents is used, the ratio of the solvents in the mixture can be adjusted to control the standing time required for gelation of the electrolyte composition.

When the abovementioned electrolyte composition is applied in DSSCs, it can further include: a metal iodide salt, iodine, an additive, or a combination thereof. Combination of LiI and $I_2$ to form a redox couple of $I^-/I_3^-$ can be exemplified as the metal iodide salt, but iodides that can be combined with iodine to form the abovementioned redox couple are not limited to lithium iodide. The additive can be 4-tert-butylpyridine (TBP), 1-ethyl-3-methylimidazolium triflate, 1-ethyl-3-methylimidazolium thiocyanate, 1-ethyl-3-methylimidazolium dicyanamide, 1-ethyl-3-methylimidazolium tricyanomethanide, 1,2-dimethyl-3-propylimidazolium iodide (DMPII), 1-ethyl-3-methylimidazolium iodide (EMII), 1-methyl-3-propylimidazolium iodide, 1-butyl-3-methylimidazolium iodide, 1-hexyl-3-propylimidazolium iodide, 1-butyl-1-methylimidazolium iodide, or a combination thereof.

Furthermore, another object of the present invention is to provide a method for manufacturing an electronic component. In the method, the abovementioned electrolyte composition is used. In the whole manufacturing, the heating process is not performed and the electrolyte composition can keep good fluidity and be easily injected into the electronic component. Subsequently, gelation of the electrolyte can successfully occur.

The method of the present invention includes the following steps: providing a first substrate and a second substrate, wherein a first electrode is disposed on the surface of the first substrate and a second electrode is disposed on the surface of the second substrate; injecting an electrolyte composition with a low gelling temperature between the first and second substrates to form an electronic component, wherein the electrolyte composition with a low gelling temperature is interposed between the first and second electrode and gels at a temperature from 0 to 50° C.; and sealing the electrode component, wherein the electrolyte composition with a low gelling temperature comprises an electrolyte gelator which is an acrylonitrile-based copolymer and a liquid electrolyte comprising a nitrile-based solvent.

In the aforesaid method, the electronic component is a dye-sensitized solar cell (DSSC). In general, when the conventional gel electrolyte is applied in an electronic device such as DSSC, the heating process needs to be performed to ensure total dissolution and high fluidity (low viscosity) of the polymer so that the electrolyte can favorably permeate into the pores of the titanium dioxide in DSSCs. The heating process can be performed at 80-140° C., commonly. If the temperature is too high in the heating process, the solvent used in the electrolyte will evaporate easily. However, if the heating temperature is not sufficient, sufficient fluidity of the electrolyte will not be guaranteed. Besides, thermal stirring, the doctor blade method, curing under vacuum, and so forth, can make the gel electrolyte. Nevertheless, such methods are complicated and consume long time and high costs, and evaporation of the solvent because of too high temperature may also occur.

By contrast, the electrolyte composition of the present invention can keep its high fluidity without the heating process and the polymer can totally dissolve therein. Hence, there is no undissolved precipitate of the polymer in the electrolyte composition. In conclusion, the electrolyte composition of the present invention can be used to simplify the method for manufacturing an electronic component and leave out the heating apparatus required in the conventional manufacturing so as to decrease the related costs.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
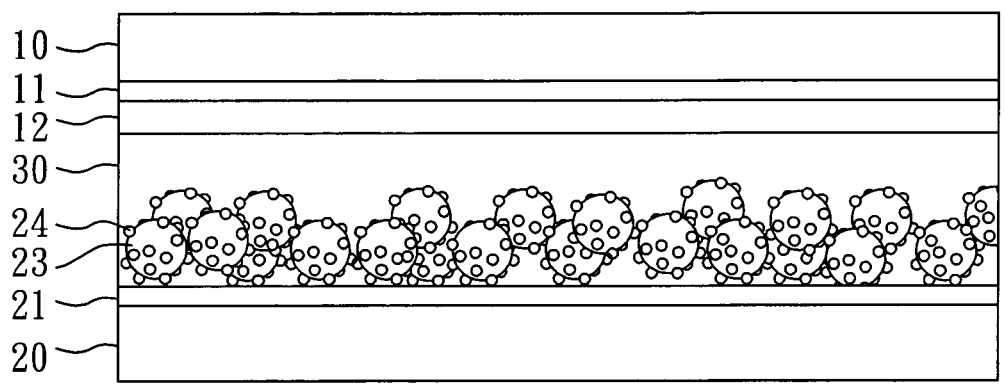
FIG. 1 is a perspective view of the structure of DSSC manufactured in Application Example 1 of the present invention.

Because of the specific embodiments illustrating the practice of the present invention, one skilled in the art can easily understand other advantages and efficiency of the present invention through the content disclosed therein. The present invention can also be practiced or applied by other variant embodiments. Many other possible modifications and variations of any detail in the present specification based on different outlooks and applications can be made without departing from the spirit of the invention.

The drawings of the embodiments in the present invention are all simplified charts or views, and only reveal elements relative to the present invention. The elements revealed in the drawings are not necessarily aspects of the practice, and quantity and shape thereof are optionally designed. Further, the design aspect of the elements can be more complex.

Example 1

Poly(acrylonitrile-co-vinyl acetate) (poly(AN-co-VA)) was prepared as an electrolyte gelator. The acrylonitrile monomer serving as a major monomer in this copolymer was in an amount of 92 wt %, and the vinyl acetate employed as a minor monomer was in an amount of 8 wt %. The number average molecular weight of the copolymer was 250,000.

Lithium iodide (LiI, 0.1M), iodine ($I_2$, 0.05M), an ionic liquid (DMPII, 0.6M), and an additive (TBP, 0.5M, 96%) were taken in a suitable amount, respectively, and dissolved in acetonitrile to form a liquid electrolyte in which $I^-/I_3^-$ served as a redox couple.

In the liquid electrolyte prepared above, poly(AN-co-VA) (7 wt %) was dissolved at 25° C. and evenly stirred at 200 rpm until being totally dissolved. This electrolyte composition with a low gelling temperature stood at room temperature for 20 days and then it was transformed into a gel electrolyte.

Example 2

In the instant example, acetonitrile in Example 1 was replaced with propionitrile (PN) serving as a solvent of the liquid electrolyte. The other components and the manufacturing processes were the same as those of Example 1.

Examples 3 to 7

Acetonitrile in Example 1 was replaced with the solvent mixtures of Examples 3 to 7 in which the volume ratios of acetonitrile to 3-methoxypropionitrile (MPN) were 70/30, 60/40, 50/50, 30/70, and 26/74, respectively. The other components and the manufacturing processes were the same as those of Example 1.

Examples 8 and 9

Acetonitrile in Example 1 was replaced with the solvent mixtures of Examples 8 and 9 in which the volume ratios of acetonitrile to valeronitrile (VCN) were 85/15, and 70/30, respectively. The other components and the manufacturing processes were the same as those of Example 1.

Comparative Example 1

In this comparative example, acetonitrile in Example 1 was replaced with 3-methoxypropionitrile (MPN) serving as a solvent of the liquid electrolyte. The other components and the manufacturing processes were the same as those of Example 1.

Since the heating process was not performed, a lot of solutes were not dissolved in the liquid electrolyte of the present comparative example. Even though the liquid electrolyte stood at room temperature for a long while, it was not transformed into a gel electrolyte.

Comparative Example 2

In this comparative example, acetonitrile was used as a solvent of the liquid electrolyte but the electrolyte gelator was not added. The other components and the manufacturing processes were the same as those of Example 1.

Comparative Example 3

In this comparative example, MPN was used as a solvent of the liquid electrolyte but the electrolyte gelator was not added. The other components and the manufacturing processes were the same as those of Example 1.

Comparative Example 4

In this comparative example, acetonitrile in Example 1 was replaced with the solvent mixture in which the volume ratio of acetonitrile to VCN was 50/50. The other components and the manufacturing processes were the same as those of Example 1.

Comparative Example 5

In this comparative example, acetonitrile in Example 1 was replaced with VCN. The other components and the manufacturing processes were the same as those of Example 1.

Application Example 1

According to a conventional technique, DSSC was assembled with reference to FIG. 1. As shown in FIG. 1, the DSSC included a first substrate 10 and a second substrate 20. The first substrate 10 had a first electrode 11 on the surface thereof. A catalyst layer 12 was formed on the surface of the first electrode 11. The second substrate 20 had a second electrode 21 on the surface thereof. $TiO_2$ was applied on the surface of the second electrode 21 to form a porous nanofilm 23. A photosensitive dye 24 was attached on the porous nanofilm 23. In the present Application Example, the first substrate 10 and the second substrate 20 were both a glass substrate. The first electrode 11 and the second electrode 12 were a fluorine-doped tin oxide (FTO) layer. The catalyst layer 12 was a platinum film. In addition, the particle size of $TiO_2$ was about 25 nm (10-50 nm in common use). The photosensitive dye 24 was N719. Nevertheless, the material of the electrodes, the particle size of $TiO_2$, and the kind of the photosensitive dye were not limited thereto.

According to the manufacturing method of Example 1, the electrolyte composition with a low gelling temperature was made. The electrolyte composition 30 was injected into the gap between the first substrate 10 and the second substrate 20, and thus it was interposed between the first electrode 11 and the second electrode 12. DSSC was formed and then sealed. In the DSSC, the electrolyte composition could gel successfully at 25° C.

During the injection of the electrolyte composition 30, bubbles were not formed between the first substrate 10 and the second substrate 20 because the electrolyte composition 30 of Example 1 exhibited good fluidity.

Application Comparative Example 1

The manner of the present application comparative example was similar to that of Application Example 1, but the electrolyte composition of Example 1 was replaced with that of Comparative Example 1. In addition, when the electrolyte composition of Comparative Example 1 was stirred evenly, it was heated to 110° C. at the same time so that the solutes therein could be totally dissolved. Besides, when the heated electrolyte was not cooled, it was injected into the gap between the first substrate 10 and the second substrate 20. After the electrolyte composition of Comparative Example 1 was totally cooled, it was transformed into a gel electrolyte.

During the injection of the electrolyte composition of Comparative Example 1, many bubbles were formed between the first substrate 10 and the second substrate 20 because the electrolyte composition of Comparative Example 1 exhibited high viscosity and poor fluidity.

Application Comparative Example 2

The manner of the present application comparative example was similar to that of Application Example 1, but the electrolyte composition of Example 1 was replaced with the liquid electrolyte of Comparative Example 2.

Application Comparative Example 3

The manner of the present application comparative example was similar to that of Application Example 1, but the electrolyte composition of Example 1 was replaced with the liquid electrolyte of Comparative Example 3.

Test Example 1

The electrolytes of Examples 1 and 2 and Comparative Example 1 were analyzed in the standing time required for gelation and the temperature at which the polymer was dissolved. The results are listed in the following Table 1.

TABLE 1

| Example | Solvent | Standing time for gelation (hr) | Temperature at which the polymer was dissolved (°C.) |
|---|---|---|---|
| Example 1 | ACN | 480 | 25 |
| Example 2 | PN | 1.5 | 50 |
| Comparative Example 1 | MPN | 0.01 | 110 |

As shown in Table 1 listed above, the carbon number of the solvents actually influences the standing time for gelation. When the carbon number of the solvent increases from 2 to 4, the standing time for gelation decreases from 480 hours to 0.01 hour. When the carbon number of the solvent is 3, the standing time for gelation only requires 1.5 hours. In addition, the carbon number of the solvent also influences the interaction between the gelator and the solvent. Therefore, the temperature at which the polymer is dissolved in the liquid electrolyte rises as the carbon number of the solvent increases.

Test Example 2

The electrolytes of Examples 1, 3 to 9 and Comparative Examples 1, 3, and 4 were analyzed in the standing time required for gelation and the temperature at which the electrolytes were flowing. The results are listed in the following Table 2.

TABLE 2

| Example | Solvent System | | Standing time for gelation (hr) | Flowing temperature (°C.) |
|---|---|---|---|---|
| Example 1 | ACN:MPN | 100:0 | 480 | 40 |
| Example 3 | | 70:30 | 13 | 45 |
| Example 4 | | 60:40 | 5 | 50 |
| Example 5 | | 50:50 | 1.5 | 55 |
| Example 6 | | 30:70 | 0.35 | 65 |
| Example 7 | | 26:74 | 0.25 | 75 |
| Comparative Example 1 | | 0:100 | 0.02 | 80 |
| Example 1 | ACN:VCN | 100:0 | 480 | 40 |
| Example 8 | | 85:15 | 6 | 45 |
| Example 9 | | 70:30 | 0.5 | 50 |
| Comparative Example 3 | | 50:50 | Solutes were separated out from the solvent | |
| Comparative Example 4 | | 0:100 | | |

As shown in Table 2, because there is relatively strong interaction between acetonitrile and the polymer during the gelation, the standing time for gelation requires the time up to 480 hours. However, the standing time for gelation can be adjusted by adding a second solvent as a co-solvent in the electrolyte. Hence, valeronitrile (VCN) and 3-methoxypropionitrile (MPN) are both used as a co-solvent and mixed with acetonitrile to form a solvent mixture. The ratio and the kind of the solvent in the mixture can influence the standing time for gelation and the flowing temperature of the electrolyte. When the ratio of MPN or VCN is increased, the standing time for gelation decreases and the flowing temperature rises accordingly.

Test Example 3

Figure 2:
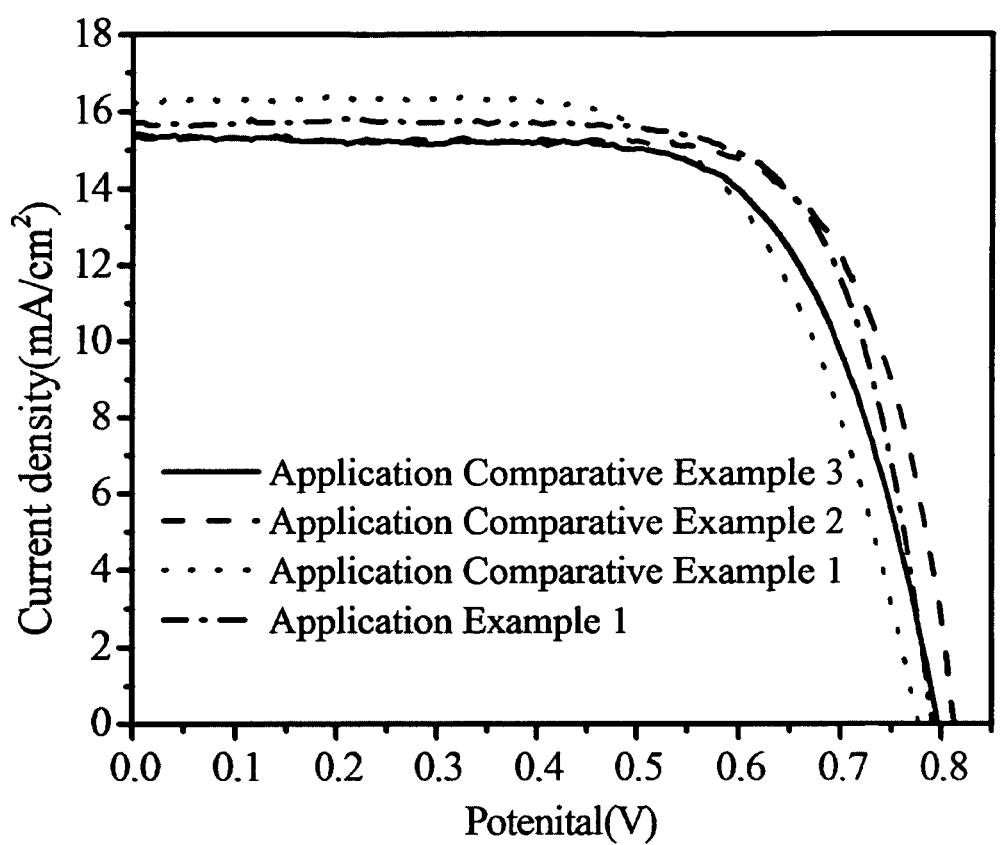
FIG. 2 shows I-V curves of DSSCs manufactured in Example 1 and Application Examples 1 to 3 of the present invention.

Respective ionic conductivities of the electrolytes made from Example 1 and Comparative Examples 1 to 3 were measured. Furthermore, photovoltaic characteristics thereof were also examined. The results are shown in the following Table 3 and FIG. 2. FIG. 2 shows I-V curves of the DSSCs of Example 1 and Comparative Examples 1 to 3.

TABLE 3

| Example | Electrolyte | Ionic conductivity (S/cm) | Photovoltaic conversion efficiency ($\eta$, %) | Fill factor (FF) | Short-circuit current (Isc, mA/cm$^2$) | Open-circuit voltage (Voc, mV) |
|---|---|---|---|---|---|---|
| Application Example 1 | Acetonitrile Gel | $6.25 \times 10^{-3}$ | 9.03 | 0.73 | 15.44 | 795 |
| Application Comparative Example 1 | MPN Gel | $3.69 \times 10^{-3}$ | 8.23 | 0.65 | 16.22 | 777 |
| Application Comparative Example 2 | Acetonitrile Liquid | $8.82 \times 10^{-3}$ | 9.04 | 0.72 | 15.37 | 818 |

TABLE 3-continued

| Example | Electrolyte | Ionic conductivity (S/cm) | Photovoltaic conversion efficiency ($\eta$, %) | Fill factor (FF) | Short-circuit current (Isc, mA/cm$^2$) | Open-circuit voltage (Voc, mV) |
|---|---|---|---|---|---|---|
| Application Comparative Example 3 | MPN Liquid | $3.97 \times 10^{-3}$ | 8.36 | 0.68 | 15.33 | 797 |

As shown in Table 3 and FIG. 2, the photovoltaic conversion efficiencies of Application Comparative Examples 2 (acetonitrile as the solvent) and 3 (MPN as the solvent), in which the liquid electrolytes were used, are 9.04% and 8.36%, respectively. The photovoltaic conversion efficiencies of Application Examples 1 (acetonitrile as the solvent) and Application Comparative Example 1 (MPN as the solvent), in which the gel electrolytes were used, are 9.03% and 8.23%, respectively. Accordingly, the photovoltaic conversion efficiencies of Application Examples 1 and Application Comparative Example 1, in which the gel electrolytes were used, are approximately 97% and 95% of those of Application Comparative Examples 2 and 3, in which the liquid electrolytes were used.

Furthermore, comparing the gel electrolyte of Application Examples 1 (acetonitrile as the solvent) with that of Application Comparative Example 1 (MPN as the solvent), it can be seen that FF of Application Examples 1 achieves 0.73, which is higher than 0.65 of FF of Application Comparative Example 1. That is, because ionic diffusion in the solvent system of acetonitrile is higher than that in the solvent system of MPN. In addition, since the viscosity of the electrolyte using acetonitrile is low, it is easy that the electrolyte permeates into the porous nanofilm 23 to desirably contact the second electrolyte 21. Hence, the dye deeply inside the DSSC can be efficiently reduced and thus the DSSC can exhibit low resistance (i.e., high FF). Accordingly, if the liquid electrolyte is replaced with a gel electrolyte in the DSSC, good photovoltaic conversion efficiency and ionic conductivity can be kept. Furthermore, the photovoltaic characteristic of the DSSC using the gel electrode can match those of the DSSC using the liquid electrode.

In general, the liquid electrolyte of DSSCs has high ionic conductivity and diffusion coefficient. If different solvents are used, the permeation to the porous nanofilm also changes accordingly. Among the nitrile-based solvents used in the present invention, acetonitrile has low boiling point (81.6° C.) and high volatility, and is not like to the conventional solvent, MPN (high boiling point 165° C. and low volatility). Therefore, it is difficult to use acetonitrile as the solvent of the liquid electrolyte, conventionally. If the solvent such as acetonitrile with low boiling point and high volatility is applied in a gel electrolyte, this application can not be achieved because the dissolution of the gelator in the electrolyte requires the heating process or the actual temperature of operation of DSSCs under full sunshine reaches 80-90° C. However, in the present invention, such solvents with low boiling point, high volatility, and difficulty to be employed are utilized together with a suitable acrylonitrile-based gelator, resulting in a gel electrolyte transformed from the liquid electrolyte at room temperature without the heating process.

In conclusion, when acetonitrile serving as the solvent of the liquid electrolyte and the acrylonitrile-based gelator are simultaneously present in the electrolyte, gelation of the liquid electrolyte can be enhanced to give a gel electrolyte and the volatility of acetonitrile can also be inhibited. Therefore, many limitations for packaging solar cells are accordingly reduced. Furthermore, the gelation can be performed at room temperature without the heating process.

Although the present invention has been explained in relation to its preferred embodiment, it is to be understood that many other possible modifications and variations can be made without departing from the scope of the invention as hereinafter claimed.

What is claimed is:

1. A dye-sensitized solar cell (DSSC) electrolyte composition comprising an electrolyte gelator including a poly(acrylonitrile-co-vinyl acetate), an acetonitrile and a 1,2-dimethyl-3-propylimidazolium iodide (DMPII).

2. The DSSC electrolyte composition as claimed in claim 1, wherein acrylonitrile in the poly(acrylonitrile-co-vinyl acetate) is in an amount of 85 wt % or more.

3. The DSSC electrolyte composition as claimed in claim 2, wherein number-average molecular weight of the poly(acrylonitrile-co-vinyl acetate) is in a range from 250,000 to 750,000.

4. The DSSC electrolyte composition as claimed in claim 1, wherein in the poly(acrylonitrile-co-vinyl acetate), acrylonitrile is in an amount from 87 to 97 wt %, and vinyl acetate is in an amount from 3 to 13 wt %.

5. The DSSC electrolyte composition as claimed in claim 1, further comprising: a metal iodide salt, iodine or a combination thereof.

* * * * *